(12) United States Patent
Althaus et al.

(10) Patent No.: US 6,540,413 B1
(45) Date of Patent: Apr. 1, 2003

(54) FIBER-OPTIC TRANSMITTING COMPONENT WITH PRECISELY SETTABLE INPUT COUPLING

(75) Inventors: Hans Ludwig Althaus, Lappersdorf; Joachim Reill, Zeilarn; Alfred Hartl, Kneiting, all of (DE)

(73) Assignee: Infineon Technologies AG, Munich (DE)

( * ) Notice: Subject to any disclaimer, the term of this patent is extended or adjusted under 35 U.S.C. 154(b) by 78 days.

(21) Appl. No.: 09/684,249

(22) Filed: Oct. 6, 2000

(30) Foreign Application Priority Data

Oct. 6, 1999 (DE) .......................................... 199 48 372

(51) Int. Cl.⁷ .................................................. G02B 6/42
(52) U.S. Cl. ........................................ 385/92; 385/88
(58) Field of Search ..................................... 385/92, 88

(56) References Cited

U.S. PATENT DOCUMENTS

| | | | |
|---|---|---|---|
| 4,186,996 A | * | 2/1980 | Bowen et al. ............. 350/96.2 |
| 5,040,862 A | | 8/1991 | Burton et al. |
| 5,416,869 A | * | 5/1995 | Yoshino ...................... 385/88 |

* cited by examiner

Primary Examiner—Georgia Epps
Assistant Examiner—Richard Hanig
(74) Attorney, Agent, or Firm—Laurence A. Greenberg; Werner H. Stemer; Ralph E. Locher

(57) ABSTRACT

In a fiber-optic transmitting component, either an adjusting sleeve (3) or a fiber flange is provided with a polarization filter (5) and an adjustment step is performed in which the adjusting sleeve (3) or the fiber flange is connected to the housing (2) of a light-emitting device (1). An axial angular position of the adjusting sleeve (3) or of the fiber flange in relation to the housing (2) is determined during a measurement of the light output from the light-emitting device (1) that has passed through the polarization filter (5), and the adjusting sleeve (3) or the fiber flange is then fixed to the housing at this relative angular position.

15 Claims, 2 Drawing Sheets

FIBER-OPTIC TRANSMITTING COMPONENT WITH PRECISELY SETTABLE INPUT COUPLING

BACKGROUND OF THE INVENTION

Field of the Invention

The present invention relates to a fiber-optic transmitting component in which, by means of an internal polarization filter, a defined proportion of the light output emitted by a light-emitting device can be set precisely and coupled into an optical fiber.

A specific class of fiber-optic transmitting components has a light-emitting component, a tubular or cylindrically shaped housing surrounding the component, and an adjusting sleeve that is fixed to the housing on the light output side. An optical fiber can be inserted and fixed in a suitable manner into the adjusting sleeve at its end facing away from the housing. Such a fiber-optic transmitting component is also referred to as a receptacle laser. The light-emitting device generally includes a semiconductor laser and optical elements, such as prisms and at least one lens, by means of which the beam of radiation emitted by the semiconductor laser can be deflected and focused onto the input end of the optical fiber fixed in the adjusting sleeve. By contrast, other fiber-optic transmitting components, specifically so-called pigtail lasers, do not have an adjusting sleeve but a fiber flange which includes a central passage opening in which an optical fiber is permanently mounted.

In the case of these fiber-optic transmitting elements, it is often desirable to ensure, during the manufacture, that only a defined proportion of the light output emitted by the light-emitting component is coupled into the optical fiber. However, without an adjustable distance between the optical fiber and the respective light-emitting component, it is very difficult or virtually impossible to set a defined, preselected input coupling level into the optical fiber during the adjusting stage, because a large number of variables determines this input coupling. Hitherto, in the case of receptacle lasers this problem has been solved by the light-emitting components, that is to say generally the semiconductor lasers, being measured and selected with regard to their emission characteristics (focal point, squint angle) and emitted power. For the purpose of the adjustment, the characteristic laser diode is assigned a suitable adjusting sleeve with the appropriate length to the fiber stop. Given the tolerances which occur in this case and which add up in each case, the respective input coupling can be set only over a wide tolerance band. The components with the desired input coupling then have to be selected by means of a measurement with a correspondingly low yield if a specific input coupling window is required in the application. In addition, a high logistical outlay for keeping stocks of different adjusting sleeves is necessary.

In order to make it possible to set the input coupling during the adjustment, some manufacturers use an additional connecting element (additional sleeve) and set the input coupling by means of axial displacement of the fiber guide. This is consequently possible only with an additional adjustment process and with the abovementioned additional sleeve as an additional mounting element. This impairs the overall mechanical stability of the component and increases the total manufacturing costs of the component as a result of the additional adjustment step and the additional mounting element.

SUMMARY OF THE INVENTION

It is accordingly an object of the invention to provide a fiber-optic transmitting component and a method for its assembly, which overcomes the above-mentioned disadvantages of the heretofore known devices and methods of this general type in which, during manufacture, it is possible to set a defined input coupling of the light output emitted by a light-emitting device into an optical fiber in a purposeful, precise manner and without any increased expenditure on adjustment, manufacture and costs.

With the foregoing and other objects in view there is provided, in accordance with the invention, a fiber-optic transmitting component from the class of receptacle lasers, having a light-emitting device, which is surrounded by a housing, and an adjusting sleeve which, at its one end, is connected to the housing and extends in the direction of a main emission direction of the beam of radiation emerging from the housing from the light-emitting device, and, at its other end, an optical fiber can be inserted and fixed in such a way that the beam of radiation can be coupled into the optical fiber, the adjusting sleeve having, at its one end, a base plate with a central opening, and a polarization filter that covers the opening being fixed indirectly or directly to the base plate.

In accordance with another object of the invention, there is provided a fiber-optic transmitting element from the classes of pigtail lasers, in which, instead of the aforementioned adjusting sleeve, a fiber flange is connected at its one surface to the housing and, at its other surface, an optical fiber is fixed in a central opening in the fiber flange in such a way that a beam of radiation emerging from the housing from the light-emitting device can be coupled into the optical fiber.

Accordingly, the fiber flange is shaped like the aforementioned base plate of an adjusting sleeve, but an optical fiber is permanently mounted in the central opening.

When setting the proportion of the light output that is coupled into the optical fiber, use is therefore made of the fact that the light-emitting device contains a semiconductor laser which emits a beam of radiation with a defined direction of polarization. The angular position of the polarization filter therefore determines the transmitted proportion of the beam of radiation through the polarization filter, and therefore the proportion of the radiation coupled into the optical fiber.

In accordance with an added object of the invention, there is provided a method of assembling a fiber-optic transmitting component. This method is based on the fact that the laser housing and the adjusting sleeve or the fiber flange with the polarization filter fixed to it are available as separate components and are then fixed to each other.

The method of assembling a fiber-optic transmitting component on the basis of the receptacle laser has the following method steps: manufacturing the light-emitting component and installing it in the housing; manufacturing the adjusting sleeve and fixing the polarization filter to the base plate of the sleeve; starting up the light-emitting device and aligning the adjusting sleeve axially with the main emission direction of the light-emitting device with the fiber plugged into the adjusting sleeve; measuring the light output of the optical radiation that has passed through the polarization filter in the glass fiber that is plugged in, as a function of an axial angular position of the adjusting sleeve; and fixing the adjusting sleeve to the housing at an axial angular position as soon as the light output assumes a previously determined value at this axial angular position.

The method of assembling a fiber-optic transmitting component on the basis of the pigtail laser differs from the abovementioned method in the fact that, instead of the adjusting sleeve, a fiber flange is manufactured, an optical fiber is mounted in the central opening of the fiber flange and a polarization filter that covers the central opening is fixed to the surface facing the light-emitting device.

It is preferable for the housing and the adjusting sleeve or the fiber flange to be cylindrically symmetrical, and for the axes of the cylinders and the main emission direction to coincide. An embodiment which is practical for fixing the housing and the adjusting sleeve consists in the housing and the adjusting sleeve each having a mounting flange, that is to say a fixing face that extends in the radial direction over the entire periphery and at which they can be fixed to each other. During the alignment and adjustment operation, the two components can be placed against each other at their mounting flanges and rotated in relation to each other until the desired light output has been achieved.

The polarization filter used can be, for example, a cost-effective grating or film polarizer or a crystal polarizer. The rotation of the adjusting sleeve or the fiber flange and of the polarization filter fixed to it relative to the housing and the light-emitting device configured in the latter causes rotation of the polarization direction of the laser radiation emitted by the light-emitting device and of the passage direction of the polarization filter in relation to each other. The polarization filter is designed in such a way that its plane of polarization is essentially parallel to the plane of oscillation of the laser beam. This therefore corresponds to the same design as is used for optical isolators.

In accordance with an additional object of the invention, the polarization filter is adhesively bonded to the base plate of the adjusting sleeve or to the fiber flange. In order to rule out any possible feedback to the laser radiation source, the polarization filter is preferably fixed in such a way that its main surfaces are inclined slightly with respect to the direction of incidence of the laser beam. For this purpose, suitable elements, such as projections, can be formed on the base plate of the adjusting sleeve or on the surface provided for this purpose on the fiber flange, or else an inclined fixing in an opening may be made possible, by means of which an appropriately inclined oblique face is formed, to which the polarization filter can be fitted.

In accordance with a further object of the invention, the polarization filter can also be fixed on a fixing element, such as a piece of curved metal sheet, which in turn is fitted to the adjusting sleeve or the fiber flange.

The fiber-optic transmitting component according to the invention, and the method for its assembly, solves the problem of the settable input coupling of the laser radiation in an elegant way. Without any additional mounting elements, the input coupling can be set by simply rotating the adjusting sleeve or the fiber flange, after which the fixing is performed at the determined angular position. The configuration according to the invention is of outstanding significance in particular for the applications which do not need the full light output emitted by the laser, but rather a precisely defined lower amount. This reduced light output may therefore be set precisely during adjustment by means of the rotary adjustment which is present in most automatic adjusters. This makes it possible, for example, to set a correspondingly fixed emitted light output in the fiber in relation to a predefined monitor current. This particular option makes it possible for the system manufacturer to incorporate these components completely mechanically and such that they can be operated directly without any costly retrimming of corresponding resistances by hand on the printed circuit board being needed.

A further advantage of the configuration according to the invention as compared with the prior art resides in the fact that, for the single-lens coupling optics which are normally used as part of the light-emitting device, the maximum convergence of the emitted beam of radiation can be set in such a way that it is optimally matched to the fiber aperture, permits specific coupling into the fiber and, at the same time, as a result of the corresponding divergence of the beam behind the focus, ensures virtually the same eye safety when the fiber is not plugged in as in the case of an open single-mode fiber, and therefore does not render any additional protective measures necessary.

Other features which are considered as characteristic for the invention are set forth in the appended claims.

Although the invention is illustrated and described herein as embodied in a fiber-optic transmitting component with precisely settable input coupling, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
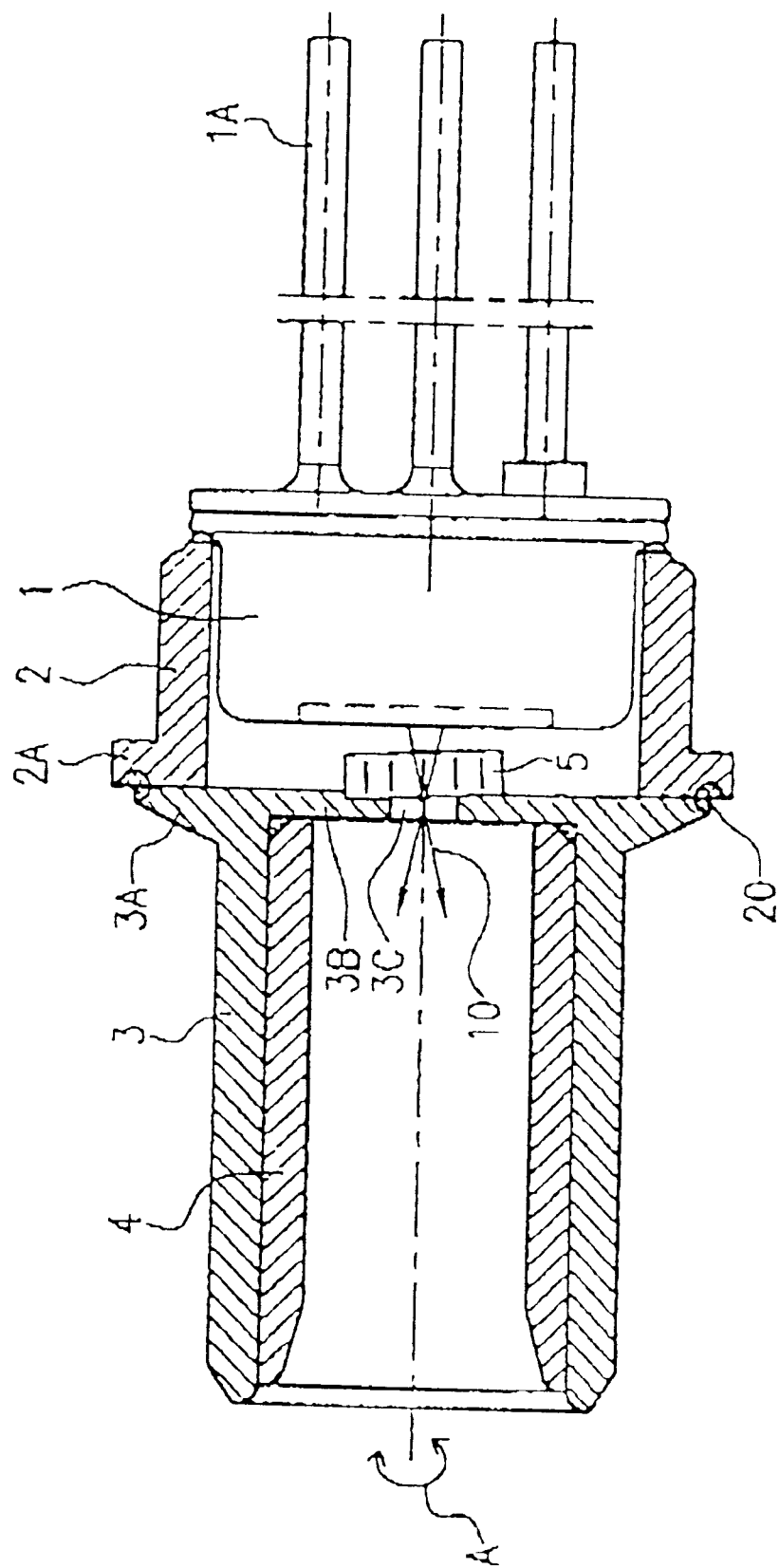
FIG. 1 shows a longitudinal section through a first embodiment of a fiber-optic transmitting component.

Referring to the figures of the drawing in detail and first, particularly, to FIG. 1 thereof, there is shown a longitudinal section of a fiber-optic transmitting component with a light-emitting device 1, which is inserted into a cylindrically symmetrical housing 2 that is open at both ends. In its interior, the light-emitting device 1 contains a laser radiation source, in particular a semiconductor laser, which can be connected via terminal pins 1A to a voltage source. With the aid of single-lens coupling optics, known per se in the prior art, a beam of radiation 10 emerging convergently from the light-emitting device 1 is produced, the intention being to couple the beam of radiation 10 into an optical fiber. On the side of the housing 2 opposite the terminal pins 1A, the housing is connected to a likewise cylindrically symmetrical adjusting sleeve 3. The axes of the cylinders of the housing 2 and of the adjusting sleeve 3, as well as the main emission direction of the light-emitting device 1, preferably coincide. It is likewise preferred for the housing 2 and the adjusting sleeve 3 to be designed to be circular in cross section.

For the purpose of fixing the adjusting sleeve 3 to the housing 2, both components in each case have, on their mutually opposite ends, a flange 2A, 3A which runs radially outward over the entire periphery. In this case—as provided in the exemplary embodiment of FIG. 1—the housing 2 can have a larger internal diameter than the adjusting sleeve 3. It is merely necessary to ensure that the flange 3A of the adjusting sleeve 3 has a radial width which is sufficient to enable it to form fixing faces which overlap the flange 2A of the housing 2 over the entire periphery. A peripheral weld 20 is preferably made in these fixing faces for the purpose of fixing.

The adjusting sleeve 3 preferably has, in its interior, an adjustment sleeve 4 which is pushed in, in a form-fitting manner with its internal diameter and is mostly formed from a ceramic or a polymer. This adjustment sleeve 4 has the task of holding an optical fiber (not illustrated) in such a way that the fiber is centered on the axis of the cylinder and can be pushed forward with its light-input-side end as far as the bottom of the adjusting sleeve 3. This is known per se from the prior art and will not be discussed further here.

The bottom of the adjusting sleeve 3 is formed by a base plate 3B, which runs out in the radial direction into the bottom face of the flange 3A and has a central drilled hole 3C for the laser radiation to pass through.

The beam of radiation 10 emerging convergently from the light-emitting device 1 is focused by the coupling optics contained in the light-emitting device 1 in such a way that its focus is located at the light-input-side end of the adjustment sleeve 4, and therefore at the light-input-side end of the optical fiber 3. However, before it enters the optical fiber, the beam of radiation 10 has passed through a polarization filter 5, by means of which its intensity has been reduced to a previously determined value. The polarization filter 5, which can be formed for example by a piece of a grating or film polarizer, has a passage direction in a plane which is essentially parallel to the plane of oscillation of the beam of radiation 10. It is therefore possible, by means of the angular position at which the adjusting sleeve 3 and the polarization filter 5 (which is fixed to the base plate 3B of the adjusting sleeve 3) are fixed to the housing 2 relative to the latter, to define the light output of the beam of radiation 10 that is coupled into the adjusting sleeve 3 or into the adjustment sleeve 4, and therefore into the optical fiber. In the exemplary embodiment of FIG. 1, the polarization filter 5 is fixed directly to the base plate 3B, and is preferably adhesively bonded on, overlapping the central opening 3C in the base plate 3B completely. In order to avoid damaging back-reflection from the main surfaces of the polarization filter 5 into the light-emitting device 1, the polarization filter 5 is fixed to the base plate 3B with a slight skew attitude. The polarization filter 5 can also be fixed to the other side of the base plate 3B or in the opening 3C.

During the assembly of the fiber-optic transmitting component of FIG. 1, first of all the housing 2 and the adjusting sleeve 3 are manufactured separately from each other. In separate fabrication processes, the light-emitting device 1 is then inserted into the housing 2. On the other hand, the adjusting sleeve 3 is provided with the polarization filter 5 on its base plate 3B and, if necessary, the sleeve 4 is inserted into the adjusting sleeve 3 and the appropriate optical fiber is inserted. The light-emitting device 1 is then started up, so that it emits a beam of laser radiation 10. Preferably with the aid of a suitable automatic adjuster, the adjusting sleeve 3 is then aligned coaxially with the housing 2 and brought close to the latter, so that the beam of laser radiation 10 passes through the polarization filter 5 and is coupled into the optical fiber. With the housing 2 mounted in a stationary position, the adjusting sleeve 3 is then set rotating about its cylindrical axis—as indicated by the arrow A—so that the light output coupled into the optical fiber varies. As soon as the desired light output to be coupled into the optical fiber has been reached, the rotational movement is stopped. At the angular position of the adjusting sleeve 3 which has been reached, the latter is fixed to the housing 2. The rotational movement of the adjusting sleeve 3 is preferably also performed by suitable rotational devices on the automatic adjuster. Provision can also be made for the desired light output to be input to a control device for the automatic adjuster, and for the rotational movement of the adjusting sleeve 3 to be terminated automatically when the desired light output is reached. The following fixing operation, which is preferably carried out by welding, can also be carried out completely automatically. As an option, during assembly the adjusting sleeve can also be kept stationary and the housing can be rotated.

Figure 2:
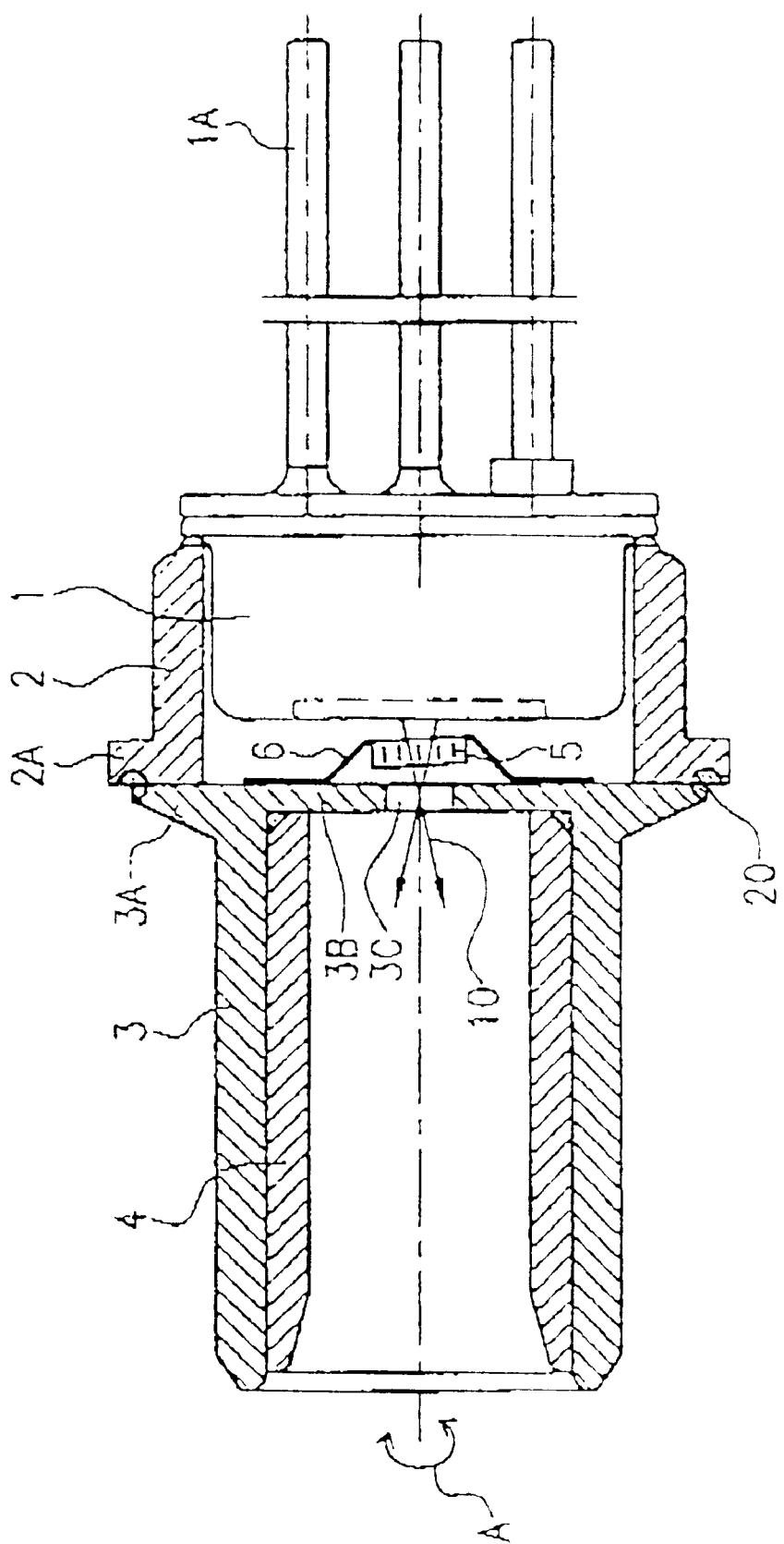
FIG. 2 shows a longitudinal section through a second embodiment of the fiber-optic transmitting component.

FIG. 2 illustrates a longitudinal section of a second exemplary embodiment of a fiber-optic transmitting component according to the invention. The elements which correspond or are functionally equivalent to the exemplary embodiment in FIG. 1 are provided with the same reference symbols and will not be further explained in the following text. The difference from the exemplary embodiment in FIG. 1 resides merely in the manner of fixing the polarization filter 5. In the exemplary embodiment of FIG. 2, the polarization filter 5 is not fixed directly to the base plate 3B of the adjusting sleeve 3 but is held indirectly by means of a fixing element 6 which is in turn fixed to the adjusting sleeve 3. The fixing element 6 may be, for example, a piece of metal sheet which is provided with fixing faces and is fixed by these to the base plate 3B on both sides of the opening 3C, for example and is adhesively bonded on or screwed on. In its central section, the fixing element 6 has a face which is inclined slightly with respect to the direction of propagation of the beam of laser radiation 10. The face has a central opening and has the polarization filter 5 adhesively bonded to it. An embodiment of this type has the advantage that the polarization filter 5 can be removed again from an adjusting sleeve 3 if required, without being damaged in the process.

The fiber-optic transmitting component of the embodiment of FIG. 2 can also be assembled by the same method as the fiber-optic transmitting component of FIG. 1. However, the present invention is not restricted to fiber-optic transmitting components for plug-in optical fibers, that is to say receptacle lasers, but can also be used, that is to say with the same effectiveness with respect to the settable coupling, in the case of so-called pigtail lasers, by the polarization filter being mounted directly on the pigtail fiber flange. In the case of this design of fiber-optic transmitting components, this pigtail fiber flange is fixed to the housing 2 or the housing flange 2A instead of the adjusting sleeve 3 of FIGS. 1 and 2. It therefore has, in principle, the same form as the base plate 3B of an adjusting sleeve 3. As opposed to the adjusting sleeve 3, in the case of a fiber flange the optical fiber is permanently connected to the fiber flange, while in the case of the adjusting sleeve 3, the optical fiber can be plugged in. Otherwise, in the case of this embodiment of the present invention, the fiber flange also has a polarization filter, which is fixed to its surface facing the light-emitting device. In the same way as the adjusting sleeve 3, the pigtail fiber flange can also be assembled with the housing 2 to form a fiber-optic transmitting component by measuring the light intensity of the laser beam that has passed through the polarization filter and, at the same time, rotating the flange about its cylindrical axis and subsequently fixing it to the housing 2 when the desired light intensity is reached.

We claim:

1. A fiber-optic transmitting component, comprising:
   a housing;
   a light-emitting device surrounded by said housing, said light-emitting device emitting a linearly polarized beam of radiation having a first polarization axis emerging from said housing in a main direction;

an adjusting sleeve having a first end connected to said housing, a base plate disposed at said first end and formed with a central opening, and a second end remote from said first end, said adjusting sleeve extending between said first end and said second end in the main direction of the beam of radiation emerging from said housing, said second end of said adjusting sleeve for receiving and fixing an optical fiber such that the beam of radiation emerging from said housing is coupled into the optical fiber, said adjusting sleeve having an inner diameter, said central opening of said base plate having a diameter smaller than said inner diameter; and a polarization filter attached to said base plate such that it covers said central opening of said base plate, said polarization filter having a second polarization axis forming a non-zero angle relative to said first polarization axis, said non-zero angle being determined by a desired light density to be coupled to the optical fiber.

2. The fiber-optic transmitting component according to claim 1, comprising a fixing element attaching said polarization filter to said base plate of said adjusting sleeve.

3. The fiber-optic transmitting component according to claim 2, wherein said fixing element has a central fixing face formed with a passage opening therein, and lateral fixing faces formed on both sides of said central opening and attaching said fixing element to said base plate of said adjusting sleeve, said polarization filter attached to said central fixing face.

4. The fiber-optic transmitting component according to claim 1, wherein said polarization filter is adhesively bonded to said base plate of said adjusting sleeve.

5. The fiber-optic transmitting component according to claim 1, wherein said housing has an end formed with a flange and said adjusting sleeve has an end formed with a flange that is fixed to said flange of said housing.

6. The fiber-optic transmitting component according to claim 5, wherein said flange of said adjusting sleeve is fixed to said flange of said housing by a welded connection.

7. A method of assembling the fiber-optic transmitting component according to claim 1, which comprises:

manufacturing said light-emitting device and installing it in said housing;

manufacturing said adjusting sleeve and fixing said polarization filter to said base plate of said sleeve adjusting sleeve;

starting up said light-emitting device and aligning said adjusting sleeve axially with the main direction of the beam of radiation emitted from said light-emitting device;

measuring a light output of the optical radiation that has passed through said polarization filter and is coupled into a glass fiber that is plugged in, as a function of an axial angular position of said adjusting sleeve relative to said housing; and fixing said adjusting sleeve to said housing at an axial angular position as soon as the light output assumes a previously determined value at this axial angular position.

8. A fiber-optic transmitting component, comprising:

a housing;

a light-emitting device surrounded by said housing, said light-emitting device emitting a linearly polarized beam of radiation having a first polarization axis emerging from said housing in a main direction;

a fiber flange having a central opening formed therein, a first surface connected to said housing, and a second surface opposite said first surface;

an optical fiber extending from said second surface and fixed in said central opening such that the beam of radiation emitted from said light-emitting device and emerging from said housing is coupled into said optical fiber; and a polarization filter attached to said first surface of said fiber flange such that it covers said central opening of said fiber flange, said polarization filter having a second polarization axis forming a non-zero angle relative to said first polarization axis, said non-zero angle being determined by a desired light density to be coupled to the optical fiber.

9. The fiber-optic transmitting component according to claim 8, comprising a fixing element attaching said polarization filter to said first surface of said fiber flange.

10. The fiber-optic transmitting component according to claim 8, wherein said polarization filter is adhesively bonded to said first surface of said fiber flange.

11. A method of assembling the fiber-optic transmitting component according to claim 8, which comprises:

manufacturing said light-emitting device and installing it in said housing;

manufacturing said fiber flange and fixing said polarization filter to said first surface of said fiber flange;

starting up said light-emitting device and aligning said fiber flange axially with the main direction of the beam of radiation emitted from said light-emitting device;

measuring a light output of the optical radiation that has passed through said polarization filter in the main direction as a function of an axial angular position of said fiber flange relative to said housing; and fixing said fiber flange to said housing at an axial angular position as soon as the light output assumes a previously determined value at this axial angular position.

12. The method according to claim 11, which comprises using an automatic adjuster to perform at least one of the defined method steps.

13. The method according to claim 11, which comprises using an automatic adjuster to perform at least one of the defined method steps.

14. A fiber-optic transmitting component, comprising:

a housing;

a light-emitting device surrounded by said housing, said light-emitting device emitting a linearly polarized beam of radiation having a first polarization axis emerging from said housing in a main direction;

an adjusting sleeve having a first end connected to said housing, a base plate disposed at said first end and formed with a central opening, and a second end remote from said first end, said adjusting sleeve extending between said first end and said second end in the main direction of the beam of radiation emerging from said housing, said second end of said adjusting sleeve for receiving and fixing an optical fiber causing the beam of radiation emerging from said housing to be coupled into the optical fiber; and a polarization filter attached to said base plate and covering said central opening of said base plate, said polarization filter having a second polarization axis forming a non-zero angle relative to said first polarization axis, said non-zero angle being determined by a desired light density to be coupled to the optical fiber, said polarization filter having a main surface and being attached to said base plate causing said main surface to be slightly inclined with respect to a direction of incidence of the beam of radiation.

15. A fiber-optic transmitting component comprising:

a housing;

a light-emitting device surrounded by said housing, said light-emitting device emitting a linearly polarized beam of radiation having a first polarization axis emerging from said housing in a main direction;

an adjusting sleeve having an interior, a first end connected to said housing, a base plate disposed at said first end and formed with a central opening, and a second end remote from said first end, said adjusting sleeve extending between said first end and said second end in the main direction of the beam of radiation emerging from said housing, said second end of said adjusting sleeve for receiving and fixing an optical fiber causing the beam of radiation emerging from said housing to be coupled into the optical fiber;

a polarization filter attached to said base plate and covering said central opening of said base plate, said polarization filter having a second polarization axis forming a non-zero a non-zero angle relative to said first polarization axis, said non-zero angle being determined by a desired light density to be coupled to the optical fiber; and an adjustment sleeve for insertion and centering of the optical fiber therein, said adjustment sleeve being disposed in said an interior of said adjusting sleeve.

* * * * *